(12) United States Patent
He et al.

(10) Patent No.: US 7,577,413 B2
(45) Date of Patent: Aug. 18, 2009

(54) METHOD AND APPARATUS FOR CALIBRATING A FILTER OF A RECEIVER

(75) Inventors: Chengming He, Austin, TX (US); Richard A. Johnson, Buda, TX (US); Alan F. Hendrickson, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 514 days.

(21) Appl. No.: 11/523,440

(22) Filed: Sep. 19, 2006

(65) Prior Publication Data

US 2008/0070539 A1    Mar. 20, 2008

(51) Int. Cl.
*H04B 17/00* (2006.01)
*H04B 1/06* (2006.01)

(52) U.S. Cl. ............... 455/226.1; 455/266; 455/339
(58) Field of Classification Search ............... 455/226.1, 455/266, 338, 339, 340
See application file for complete search history.

(56) References Cited

U.S. PATENT DOCUMENTS

| | | | |
|---|---|---|---|
| 3,748,602 A | 7/1973 | Delfrate et al. | |
| 4,645,951 A | 2/1987 | Uragami | |
| 4,885,548 A | 12/1989 | Wakimoto et al. | |
| 5,357,257 A | 10/1994 | Nevin | |
| 5,363,066 A | 11/1994 | Chen et al. | |
| 5,822,687 A * | 10/1998 | Bickley et al. ............ | 455/226.1 |
| 5,920,215 A | 7/1999 | Drost et al. | |
| 6,246,431 B1 | 6/2001 | Mycynek | |
| 6,363,102 B1 | 3/2002 | Ling et al. | |
| 6,433,582 B2 | 8/2002 | Hirano | |
| 6,472,915 B1 | 10/2002 | Moyal et al. | |
| 6,566,961 B2 | 5/2003 | Dasgupta et al. | |
| 6,737,920 B2 | 5/2004 | Jen et al. | |
| 6,741,121 B2 | 5/2004 | Huber | |
| 6,747,497 B2 | 6/2004 | Ingino, Jr. | |
| 7,020,226 B1 | 3/2006 | Kirkland | |
| 7,109,793 B2 | 9/2006 | Nakatani et al. | |
| 7,109,799 B2 | 9/2006 | Yin et al. | |
| 7,251,291 B1 | 7/2007 | Dubuc et al. | |
| 7,392,015 B1 | 6/2008 | Farlow et al. | |
| 2002/0101840 A1 | 8/2002 | Davidsson et al. | |
| 2003/0007574 A1 | 1/2003 | Li et al. | |
| 2003/0095589 A1 | 5/2003 | Jeong | |
| 2003/0123534 A1 | 7/2003 | Tsui et al. | |
| 2004/0106380 A1 | 6/2004 | Vassiliou et al. | |
| 2004/0203472 A1 | 10/2004 | Chien | |
| 2005/0070236 A1 | 3/2005 | Paulus | |

(Continued)

*Primary Examiner*—Nguyen Vo
(74) *Attorney, Agent, or Firm*—Polansky & Associates, PLLC (57) ABSTRACT

According to a disclosed method, a calibration signal is provided at a first frequency corresponding to a low frequency edge of a desired passband to an input of a filter (240). A first value is measured at an output of the filter (240). The calibration signal is provided at a second frequency corresponding to a high frequency edge of the desired passband to the input of the filter (240). A second value is measured at the output of the filter (240). The first value is compared to the second value. A characteristic of the filter (240) is changed in response to the comparing. In one form, the filter is an IF filter (240) and a receiver (200) includes both the IF filter (240) and a calibration circuit (250) for forming the calibration signal and providing the calibration signal to the IF filter to change the characteristic in response to a calibration operation.

20 Claims, 3 Drawing Sheets

U.S. PATENT DOCUMENTS

| | | |
|---|---|---|
| 2005/0070239 A1 | 3/2005 | Paulus |
| 2005/0118980 A1* | 6/2005 | Pai et al. .................... 455/340 |
| 2005/0248478 A1 | 11/2005 | Ling |
| 2005/0260949 A1 | 11/2005 | Kiss et al. |
| 2006/0083335 A1 | 4/2006 | Seendripu et al. |
| 2006/0262872 A1 | 11/2006 | Green et al. |
| 2007/0123188 A1 | 5/2007 | Mo et al. |
| 2008/0160916 A1 | 7/2008 | Jagger et al. |

* cited by examiner

METHOD AND APPARATUS FOR CALIBRATING A FILTER OF A RECEIVER

CROSS-REFERENCE TO RELATED, CO-PENDING APPLICATIONS

The present application is related to the following co-pending U.S. patent applications:
1. "RECEIVER WITH IMAGE REJECTION CALIBRATION AT AN UNDESIRED PICTURE CARRIER AND METHOD THEREFOR," application Ser. No. 11/263,279, invented by Li Gao, Richard A. Johnson, and James M. Nohrden, and filed on Oct. 31, 2005 and assigned to the assignee hereof; and
2. "RECEIVER WITH MULTI-TONE WIDEBAND I/Q MISMATCH CALIBRATION AND METHOD THEREFOR," application Ser. No. 11/263,280, invented by Li Gao, Richard A. Johnson, and James M. Nohrden, and filed on Oct. 31, 2005 and assigned to the assignee hereof.

FIELD OF THE DISCLOSURE

The present application is generally related to radio frequency receivers, and more particularly, to correction of received signals in receiver systems.

BACKGROUND

Modern communications systems transmit and receive information by modulating a radio frequency (RF) carrier signal with an information signal. The information signal can be at a much lower frequency than the RF signal. Such systems can then demodulate the RF signal to recover the information signal.

RF receivers typically use heterodyning to convert a received RF signal to a lower frequency signal, known as the intermediate frequency (IF) signal, to make it easier to filter. Generally, heterodyning refers to a process of mixing (or multiplying) the RF signal with a local oscillator (LO) signal. The mixing process translates the RF signal to sum and difference frequencies. If the LO signal is provided with a frequency that mixes a selected one of the sum and difference frequencies of a desired channel to a fixed IF, then the mixed signal can then be subsequently filtered using a fixed-frequency IF filter that can be made high quality since the filter doesn't have to be tunable.

There are many known architectures for practical IF filters. However certain characteristics of these filters such as passband center frequency and bandwidth will differ from their ideal characteristics due to variations in component values. The problem becomes worse when the filter is implemented in a single integrated circuit, since on-chip components usually have wide tolerances of about 20% and thus vary over a wider range than comparable discrete components.

One solution to the problem is to perform calibration. During calibration, the values of circuit components are varied and the operation of the resulting IF filter is measured. The calibration operation continues until "optimum" values of the components are determined.

The calibration operation can cause problems of its own. The local oscillator can provide calibration tones that are input to the IF filter to measure its frequency response. The calibration tone can then be varied in frequency while the response of the filter measured, and the components of the IF filter can be adjusted until the filter is accurately tuned to the desired IF. Local oscillators typically use phase locked loops that multiply a relatively low frequency reference clock signal to a higher frequency suitable as the LO signal. If the LO is used to provide the calibration signal, then the PLL would have to re-lock every time the calibration tone frequency is changed, causing an unacceptably long calibration operation.

SUMMARY

In one form, a method is disclosed in which a calibration signal is provided at a first frequency corresponding to a low frequency edge of a desired passband to an input of a filter. A first value is measured at an output of the filter. The calibration signal is provided at a second frequency corresponding to a high frequency edge of the desired passband to the input of the filter. A second value is measured at the output of the filter. The first value is compared to the second value. A characteristic of the filter is changed in response to the comparing.

In another form, a receiver includes a frequency (IF) filter and a calibration circuit. The filter has a first input for receiving an input signal, a second input for receiving a calibration signal, and an output for providing a filtered signal. The calibration circuit has an input coupled to the output of the filter, and a first output coupled to the second input of the filter. The calibration circuit measures first and second values at the output of the filter when the input signal is respectively at first and second frequencies respectively corresponding to lower and upper edges of a desired passband of the filter, and provides the calibration signal in response to a comparison of the first value to the second value.

In yet another form, a receiver includes a mixer, a local oscillator, an intermediate frequency (IF) filter, and a calibration circuit. The mixer has a first input for receiving an input signal, a second input, and an output. The local oscillator has an input for receiving a frequency control signal, and an output coupled to the second input of the mixer. The IF filter has a first input coupled to the output of the mixer, a second input for receiving a calibration signal, and an output for providing an IF signal. The calibration circuit has an input coupled to the output of the IF filter, a first output coupled to the input of the local oscillator, and a second output coupled to the second input of the IF filter. The calibration circuit provides the frequency control signal at first and second frequencies corresponding to lower and upper edges of a passband of the IF filter, measures first and second values corresponding thereto at the output of the IF filter, and compares the first and second values to provide the calibration signal in response thereto.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
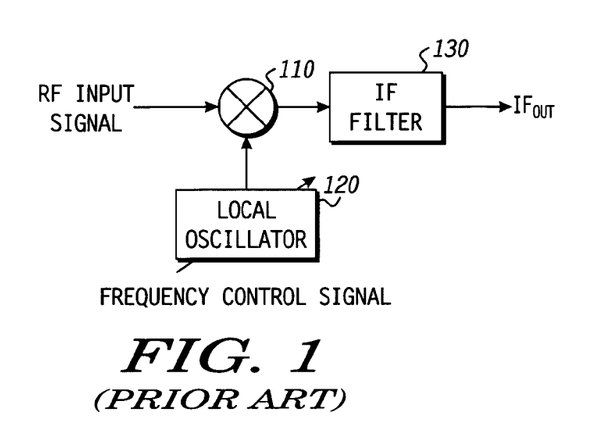
FIG. 1 illustrates in block diagram form a portion of a radio frequency (RF) receiver known in the prior art.

FIG. 1 illustrates in block diagram form a portion of a radio frequency (RF) receiver 100 known in the prior art. Receiver 100 includes a mixer 110, a local oscillator 120, and an intermediate frequency (IF) filter 130. Mixer 110 has a first input for receiving an RF input signal labeled "RF INPUT SIGNAL", a second input, and an output. Local oscillator 120 has a tuning input for receiving a signal labeled "FREQUENCY CONTROL SIGNAL", and an output connected to the second input of mixer 110. IF filter 130 has an input connected to the output of mixer 110, and an output for providing an output signal labeled "IF$_{OUT}$".

Receiver 100 is a superheterodyne receiver that receives an RF signal and tunes the RF signal using a variable frequency local oscillator 120. The mixing process produces sum and difference signals at the output of mixer 110. The frequency of local oscillator 120 is selected to mix a desired channel of the RF INPUT SIGNAL to a fixed IF. IF filter 130 can be made high quality since it does not have to be tuned for each channel.

When IF filter 130 is implemented with real components, and in particular when it is implemented on a single integrated circuit chip, the characteristics of circuit elements are less than ideal, resulting in distortion and poor signal-to-noise ratio (SNR). It would be helpful if IF filter 130 could be adjusted or calibrated for better implementation on a single integrated circuit chip.

Figure 2:
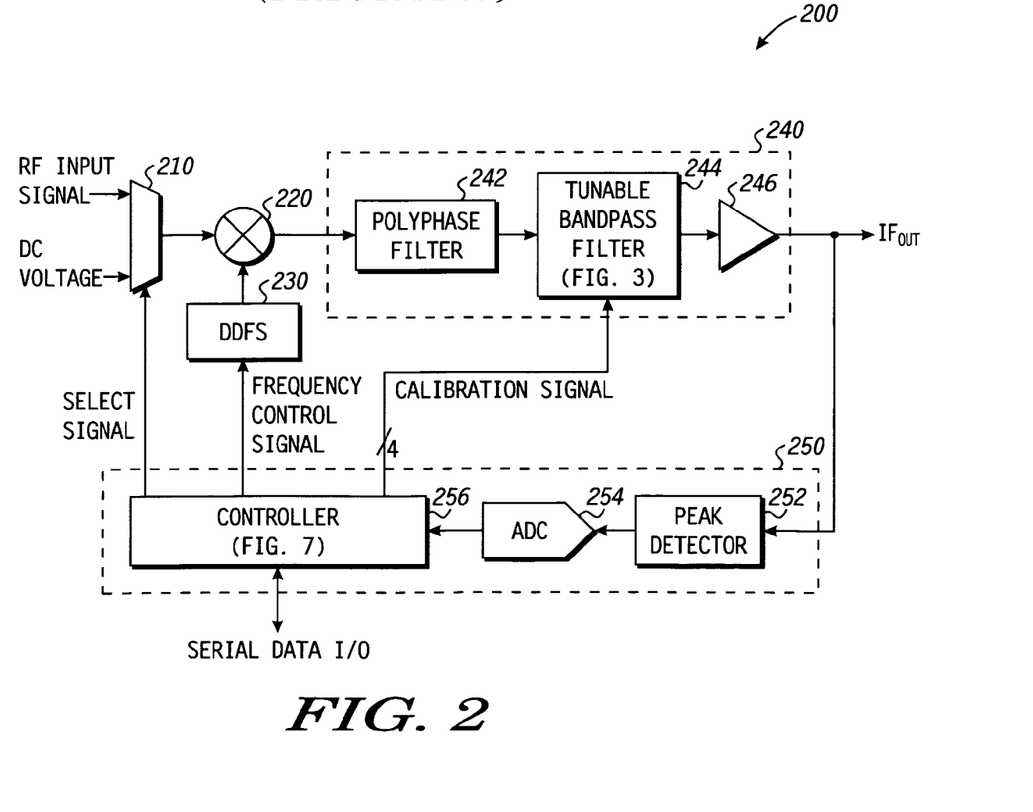
FIG. 2 illustrates in block diagram form a portion of a receiver including a calibration circuit according to the present invention.

FIG. 2 illustrates in block diagram form a portion of a receiver 200 including a calibration circuit 250 according to the present invention. Receiver 200 includes generally a multiplexer (MUX) 210, a mixer 220, a local oscillator in the form of a direct digital frequency synthesizer (DDFS) 230, an IF filter 240, and a calibration circuit 250. MUX 210 has a first input for receiving the RF INPUT SIGNAL, a second input for receiving a value labeled "DC VOLTAGE", a control input for receiving a signal labeled "SELECT SIGNAL", and an output. Mixer 220 has a first input connected to the output of MUX 210, a second input, and an output. DDFS 230 has an input for receiving the FREQUENCY CONTROL SIGNAL, and an output connected to the second input of mixer 220. IF filter 240 has an input connected to the output of mixer 220, a calibration input for receiving a 4-bit value labeled "CALIBRATION SIGNAL", and an output for providing signal IF$_{OUT}$. Calibration circuit 250 has an input connected to the output of IF filter 240, a bidirectional terminal for conducting a signal labeled "SERIAL DATA I/O", a first output connected to the calibration input of IF filter 240 for providing the CALIBRATION SIGNAL, a second output connected to the input of DDFS 230 for providing the FREQUENCY CONTROL SIGNAL, and a third output connected to the control input of MUX 210 for providing the SELECT SIGNAL.

More particularly, IF filter 240 includes a polyphase filter 242, a tunable bandpass filter 244, and an amplifier 246. Polyphase filter 242 has an input connected to the output of mixer 220, and an output. Tunable bandpass filter 244 has a signal input connected to the output of bandpass filter 242, a calibration input connected to the first output of calibration circuit 250 for receiving the CALIBRATION SIGNAL therefrom, and an output. Amplifier 246 has an input connected to the output of tunable bandpass filter 244, and an output for providing the IF$_{OUT}$ signal.

Figure 3:
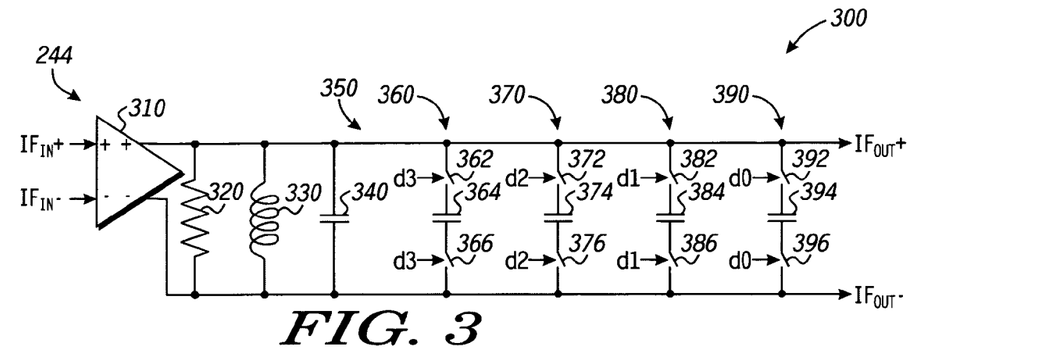
FIG. 3 illustrates in schematic form the tunable bandpass filter of FIG. 2.

Tunable bandpass filter 244 is better understood with reference to FIG. 3, which illustrates tunable bandpass filter 244 of FIG. 2 in schematic form. Tunable bandpass filter 244 includes generally an operational amplifier 310, a resistor 320, an inductor 330, a fixed capacitor 340, and a tunable capacitor 350. Operational amplifier 310 has a positive input terminal for receiving a positive component of a differential input signal labeled "IF$_{IN}$+", a negative input terminal for receiving a negative component of the differential input signal labeled "IF$_{IN}$−", a positive output terminal for providing a positive component of a filtered differential output signal labeled "IF$_{OUT}$+", and a negative output terminal for providing a negative component of the filtered differential output signal labeled "IF$_{OUT}$−". Resistor 320 has a first terminal connected to the positive output terminal of operational amplifier 310, and a second terminal connected to the negative output terminal of operational amplifier 210. Inductor 330 has a first terminal connected to the positive output terminal of operational amplifier 310, and a second terminal connected to the negative output terminal of operational amplifier 210. Capacitor 340 has a first terminal connected to the positive output terminal of operational amplifier 310, and a second terminal connected to the negative output terminal of operational amplifier 310. Tunable capacitor 350 has a first terminal connected to the positive output terminal of operational amplifier 310, a second terminal connected to the negative output terminal of operational amplifier 210, and a control input terminal connected to the first output terminal of calibration circuit 250 of FIG. 2 for receiving the CALIBRATION SIGNAL therefrom.

In the example shown in FIG. 2, the CALIBRATION SIGNAL is a 4-bit digital signal having bits labeled "d3", "d2", "d1", and "d0" in which "d3" is the most significant bit, and "d0" is the least significant bit. Tunable capacitor 350 has four sections 360, 370, 380, and 390 corresponding to the four bits of the CALIBRATION SIGNAL with corresponding switches and capacitors.

Section 360 includes a switch 362, a capacitor 364, and a switch 366. Switch 362 has a first current conducting terminal connected to the positive output terminal of operational amplifier 310, a second current conducting terminal, and a control terminal for receiving the d3 bit. Capacitor 364 has a first terminal connected to the second current conducting terminal of switch 362, and a second terminal. Switch 366 has a first current conducting terminal connected to the second terminal of capacitor 364, a second current conducting terminal connected to the negative output terminal of operational amplifier 310, and a control terminal for receiving the d3 bit.

Section 370 includes a switch 372, a capacitor 374, and a switch 376. Switch 372 has a first current conducting terminal connected to the positive output terminal of operational amplifier 310, a second current conducting terminal, and a control terminal for receiving the d2 bit. Capacitor 374 has a first terminal connected to the second current conducting terminal of switch 372, and a second terminal. Switch 376 has a first current conducting terminal connected to the second terminal of capacitor 374, a second current conducting terminal connected to the negative output terminal of operational amplifier 310, and a control terminal for receiving the d2 bit.

Section 380 includes a switch 382, a capacitor 384, and a switch 386. Switch 382 has a first current conducting terminal connected to the positive output terminal of operational amplifier 310, a second current conducting terminal, and a control terminal for receiving the d1 bit. Capacitor 384 has a first terminal connected to the second current conducting terminal of switch 382, and a second terminal. Switch 386 has a first current conducting terminal connected to the second terminal of capacitor 384, a second current conducting terminal connected to the negative output terminal of operational amplifier 310, and a control terminal for receiving the d1 bit.

Section 390 includes a switch 392, a capacitor 394, and a switch 396. Switch 392 has a first current conducting terminal connected to the positive output terminal of operational amplifier 310, a second current conducting terminal, and a control terminal for receiving the d0 bit. Capacitor 394 has a first terminal connected to the second current conducting terminal of switch 392, and a second terminal. Switch 396 has a first current conducting terminal connected to the second terminal of capacitor 394, a second current conducting terminal connected to the negative output terminal of operational amplifier 310, and a control terminal for receiving the d0 bit.

Tunable bandpass filter 244 is a parallel resonant RLC filter. Resistor 320, inductor 330, and capacitor 340 provide a fixed reactance, and tunable capacitor 350 provides a variable reactance. The fixed reactance is chosen such that in combination with capacitor 364, the resonant frequency will be equal to the desired center frequency when all of these components are at their respective nominal values. For example the standard IF for NTSC is centered at 44 MHz, and resistor 320, inductor 330, and capacitors 340 and 364 would set the nominal resonant frequency at 44 MHz. For non-ideal circuit elements, the actual center frequency may be higher or lower than the desired center frequency but selecting the nominal value will cause the actual frequency to be higher than the desired frequency about as often as it is lower.

Capacitors 364, 374, 384, and 394 are binarily weighted. Thus they are suitable for use with a digital CALIBRATION SIGNAL in which the calibration can be completed rapidly. In an alternative embodiment, capacitors 364, 374, 384, and 394 could be equally weighted and calibration circuit 250 could provide a thermometer coded CALIBRATION SIGNAL.

Returning now to FIG. 2, calibration circuit 250 includes a peak detector 252, an analog-to-digital converter (ADC) 254, and a controller 256. Peak detector 252 has an input connected to the output of IF filter 240 for receiving the $IF_{OUT}$ signal therefrom, and an output. ADC 254 has an input connected to the output of peak detector 252, and an output. Controller 256 has an input connected to the output of ADC 254, a bidirectional terminal for conducting the SERIAL DATA I/O signal, a first output connected to the calibration input of IF filter 240 for providing the CALIBRATION SIGNAL thereto, a second output connected to the input of DDFS 230 for providing the FREQUENCY CONTROL SIGNAL thereto, and a third output connected to the control input of MUX 210 for providing the SELECT SIGNAL thereto.

Generally, receiver 200 is a superheterodyne receiver that uses DDFS 230 to provide a mixing signal to tune a selected channel in the RF INPUT SIGNAL to a fixed IF. In the illustrated embodiment, receiver 200 is a television tuner and in a National Television Standards Committee (NTSC) mode suitable for North American broadcast television, the fixed IF has a center frequency of 44 megahertz (MHz) and a bandwidth of 6 MHz for a signal spectrum of from 41 MHz to 47 MHz. Alternatively in a phase alternation line (PAL) mode suitable for European broadcast television, the fixed IF has a center frequency of 35 MHz and a bandwidth of 8 MHz for a signal spectrum from 31 MHz to 39 MHz. It should be apparent that these modes are exemplary and other modes are possible, and moreover a calibration operation as described herein is applicable to similar IF spectra.

Receiver 200 has two modes of operation. In a first mode of operation, known as the normal operation mode, controller 256 provides the SELECT SIGNAL to select the first input of MUX 210, and the FREQUENCY CONTROL SIGNAL causes DDFS 230 to output the local oscillator signal at a frequency chosen to allow mixer 220 to tune a selected one of the sum and difference frequencies to the fixed IF. In the NTSC example, the desired channel will be mixed to a frequency band centered at 44 MHz. IF filter 240 then cancels image signals and filters out signals that are outside the desired IF passband (from 41 MHz to 47 MHz in the NTSC example).

Note that the output of mixer 220 is illustrated as a single signal but mixer 220 actually generates both in-phase and quadrature components of the mixed signal, and their complements, for use in polyphase filter 242. Polyphase filter 242 operates to cancel the image frequency in the signal at the output of mixer 220. Tunable bandpass filter 244 on the other hand is a high quality analog filter designed to attenuate the frequency content of the mixed IF signal that lies outside the desired passband. The center frequency of tunable bandpass filter 244 is tunable within a limited range in response to the CALIBRATION SIGNAL. Amplifier 246 is provided to amplify the signal at the output of tunable bandpass filter 244 to a level sufficient to provide to an off-chip surface acoustic wave (SAW) filter for further filtering.

In a second mode of operation, known as the calibration mode, calibration circuit 250 adjusts the value of the CALIBRATION SIGNAL to compensate for gain droop in IF filter 240 so that the passband of IF filter 240 is accurately centered around the desired center frequency. Calibration circuit 250 generally operates as follows. Calibration circuit 250 first sets the CALIBRATION SIGNAL to an initial predetermined value as will be described more fully below. Calibration circuit 250 causes mixer 220 to output a calibration tone at a frequency, labeled "$f_1$" corresponding to a low frequency edge of the desired passband of IF filter 240. It does this by setting the SELECT SIGNAL such that MUX 210 selects the DC VOLTAGE. Calibration circuit 250 sets the FREQUENCY CONTROL SIGNAL to $f_1$, which when mixed with the DC VOLTAGE produces a pure tone at the desired frequency $f_1$. Calibration circuit 250 measures the peak amplitude of $IF_{OUT}$ using peak detector 252 when the input to IF filter 240 is at $f_1$ as a value designated "A1". Similarly calibration circuit 250 next causes mixer 220 to output a calibration tone at a frequency corresponding to a high frequency edge of the desired passband of IF filter 240, labeled "$f_2$". Calibration circuit 250 measures the peak amplitude of $IF_{OUT}$ when the input to IF filter 240 is at $f_2$ as a value designated "A2".

Figure 4:
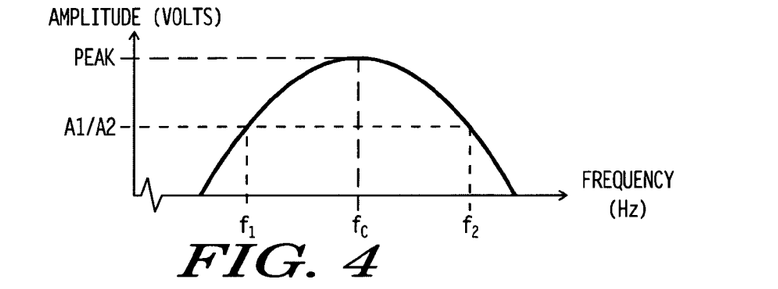
FIG. 4 illustrates a graph of an ideal frequency response of the filter of FIG. 3.
Figure 5:
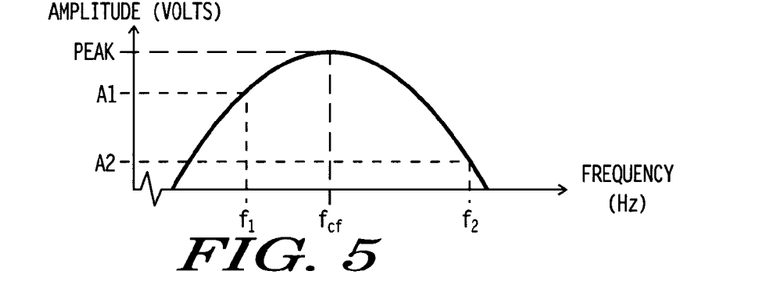
FIG. 5 illustrates a graph of a frequency response of the filter of FIG. 3 when the actual center frequency is below the ideal center frequency.
Figure 6:
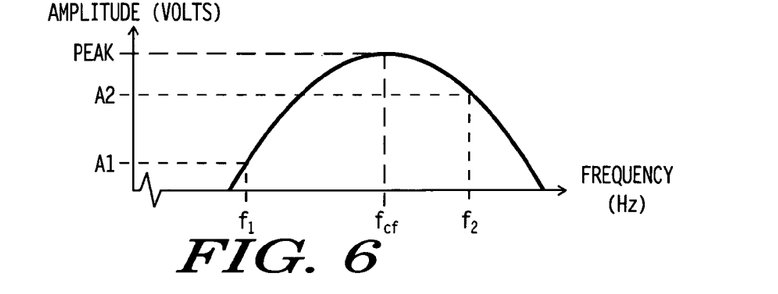
FIG. 6 illustrates a graph of a frequency response of the filter of FIG. 3 when the actual enter frequency is above the ideal center frequency.

The reason why measuring A1 and A2 is helpful to the calibration process can be understood with reference to FIGS. 4-6. FIG. 4 illustrates a graph of an ideal frequency response of tunable bandpass filter 244 of FIG. 3. In FIG. 4, the horizontal axis represents frequency, in Hz, and the vertical axis represents amplitude in volts. A curve 400 represents the frequency response of an input at the selected frequency. As shown in FIG. 4, curve 400 is centered around a center frequency labeled "$f_c$" at which frequency the amplitude reaches a peak value labeled "PEAK". FIG. 4 illustrates two frequencies of interest: a first frequency $f_1$ that corresponds to a low frequency edge of the passband of tunable bandpass filter 244, and a second frequency $f_2$ that corresponds to a high frequency edge of the passband of tunable bandpass filter 244. In the example of an NTSC television receiver, $f_c$ is equal to 44 MHz, $f_1$ corresponds to the low frequency edge at 41 MHz, and $f_2$ corresponds to the high frequency edge at 47

MHz. Note that $f_1$ and $f_2$ need not be the actual upper and lower frequency edges but will in some way correspond to these edges. In the ideal case shown in FIG. 4, A1=A2.

However in an actual filter made with real components having significant tolerances, the actual $f_c$ will likely be shifted somewhat from the ideal $f_c$. In this case, the calibration process can adjust the CALIBRATION SIGNAL to move the actual $f_c$ closer to the ideal $f_c$. FIG. 5 illustrates a graph of the frequency response of the filter of FIG. 3 when the actual center frequency, labeled "$f_{cf}$" is below the ideal center frequency. In FIG. 5, the horizontal axis represents frequency, in Hz, and the vertical axis represents amplitude in volts. A curve 500 represents the frequency response of an input at the selected frequency. Note that the PEAK of curve 500 occurs at a frequency that is lower than $f_c$.

FIG. 6 illustrates a graph of the frequency response of the filter of FIG. 3 when the actual center frequency is above the ideal center frequency. In FIG. 6, the horizontal axis represents frequency, in Hz, and the vertical axis represents amplitude in volts. A curve 600 represents the frequency response of an input at the selected frequency. Note that the PEAK of curve 600 occurs at a frequency $f_{cf}$ that is higher than $f_c$.

By changing the value of the capacitances in variable capacitor 350 in FIG. 3 in response to the CALIBRATION SIGNAL, the resonant frequency of tunable bandpass filter 244 can be shifted up or down within its limited timing range. Moreover in order to provide a simple calibration process, the inventors discovered that the difference between A1 and A2 determines the shifting of the actual curve from the ideal curve. Receiver 200 uses this information to adjust the value of the CALIBRATION SIGNAL to shift the actual curve back toward the ideal characteristic. Mathematically, the total capacitance $C_{TOT}$ is given by:

$$C_{TOT}=C_F+d_3C_{364}+d_2C_{374}+d_1C_{384}+d_0C_{394} \quad [1]$$

in which $C_F$ is the capacitance of capacitor 340, $C_{364}$ is the capacitance of capacitor 364, and so on. The center frequency, i.e. the resonant frequency of tunable bandpass filter 244, is given by:

$$f_c = \frac{A}{\sqrt{C_{TOT}}} \quad [2]$$

in which A is a constant related to the resistance of resistor 320 and the inductance of inductor 330. Thus in FIG. 5 A1 is greater than A2, and controller 256 decreases the CALIBRATION SIGNAL, thereby decreasing the capacitance and increasing $f_c$, and in FIG. 6 A1 is less that A2, and controller 256 increases the CALIBRATION SIGNAL, thereby increasing the capacitance and reducing $f_c$.

In the illustrated embodiment, capacitors 364, 374, 384, and 394 are binarily weighted. Controller 256 initially sets <d3:d0> to <1000>, which corresponds to the midpoint of tunable capacitor 250. Thus, the calibration process can raise or lower $f_c$ by about the same amount.

Returning now to FIG. 2, after determining the values of A1 and A2 for the initial value of the CALIBRATION SIGNAL, calibration circuit 250 compares A1 to A2. If A1 is greater than A2, then calibration circuit 250 determines that the actual center frequency of IF filter 240 is less than the desired or ideal center frequency, and calibration circuit 250 adjusts the CALIBRATION SIGNAL to a new value to move the center frequency of IF filter 240 higher, and repeats the steps outlined above. If A1 is less than A2, then calibration circuit 250 determines that the actual center frequency of IF filter 240 is greater than the desired or ideal center frequency, and calibration circuit 250 adjusts the CALIBRATION SIGNAL to a new value to move the center frequency of IF filter 240 lower, and repeats the steps outlined above. Calibration circuit 250 repeats this process until it determines an optimum value for the 4-bit CALIBRATION SIGNAL. In the illustrated embodiment, the optimum value is the value of the CALIBRATION SIGNAL at which value A1=A2 (or at which A1 is closest to A2). Note that controller 256 sees A1 and A2 as digital values at the output of ADC 254 so that A1 could exactly equal A2 when the actual center frequency is sufficiently close to the desired center frequency.

Alternatively, calibration circuit 250 could measure another characteristic of $IF_{OUT}$, such as power, that indicates whether the center frequency of the passband of IF filter 240 is above or below the desired center frequency. Calibration circuit 250 could use measured power of $IF_{OUT}$ at frequencies $f_1$ and $f_2$ to determine the optimum value of the CALIBRATION SIGNAL as described above.

Measuring both A1 and A2 is advantageous for quick calibration. The comparison between A1 and A2 determines whether the desired passband is higher or lower than actual passband, facilitating the rapid determination of the optimum value of the CALIBRATION SIGNAL. Moreover the availability of DDFS 230 allows receiver 200 to perform these measurements quickly, even though the LO frequency must be repeatedly changed, because DDFS 230 outputs the new LO signal as a series of digital samples of a sinusoid immediately, without requiring a lock time like a PLL-based oscillator.

Figure 7:
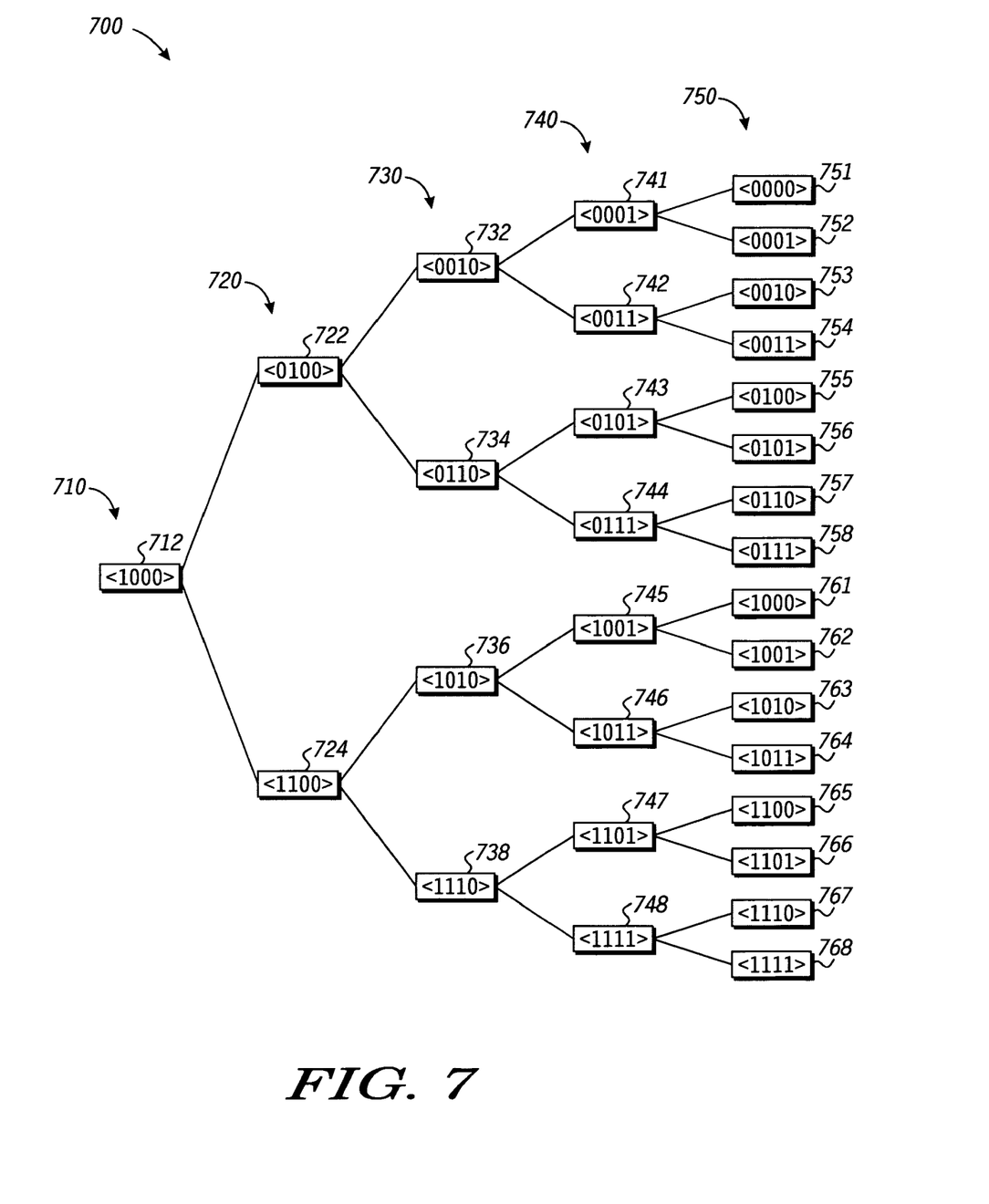
FIG. 7 illustrates a decision tree for use with the controller of FIG. 3.

While there are many ways of determining the optimum value of the CALIBRATION SIGNAL, in order to converge quickly controller 256 performs a binary search as described more fully in FIG. 7, which illustrates a decision tree 700 used by controller 256 of FIG. 2. Controller 256 moves through decision tree 700 to determine the optimum value of the CALIBRATION SIGNAL. The process starts at step 710, in which controller 256 sets the CALIBRATION SIGNAL to the initial value of <1000> at box 712. Calibration circuit 250 measures the amplitude of $IF_{OUT}$ through peak detector 252 and ADC 254 first at $f_1$ (to determine A1) and then at $f_2$ (to determine A2). Controller 256 then proceeds to step 720. If A1>A2, then controller 256 takes the upper branch to set the CALIBRATION SIGNAL to the lower value of <0100> at box 722. If A1<A2, then controller 256 takes the lower branch to set the CALIBRATION SIGNAL to the higher value of <100> at box 724. Calibration circuit 250 again measures A1 and A2 for use in step 730. If A1>A2, then controller 256 takes the corresponding upper branch to set the CALIBRATION SIGNAL to either <0010> at box 732 or <1010> at box 736. If A1<A2, then controller 256 takes the corresponding lower branch to set the CALIBRATION SIGNAL to either <0110> at box 734 or <1110> at box 738. The process continues in a similar fashion during step 740 to set the CALIBRATION SIGNAL to one value in a corresponding box 741-748, and then during step 750 to set the CALIBRATION SIGNAL to a final value in a corresponding box 751-758 and 761-768.

After determining the final value of the CALIBRATION SIGNAL, controller 250 enters the normal operation mode by changing the SELECT SIGNAL to select the first input of MUX 210, and the FREQUENCY CONTROL SIGNAL to tune the desired channel to the selected IF.

Note that the calibration process can be carried out at a variety of times. For example, the calibration process could be carried out every time the user changes the channel. Since the components of IF filter 240 change during operation such as by heating, intermittent calibration keeps $f_c$ as close to the ideal $f_c$ as possible. It could also be carried out periodically between channel changes to compensate for heating. Each time the calibration process is to be carried out, a system controller (not shown in FIG. 2) signals receiver 200 to enter the calibration mode through the SERIAL DATA I/O signal.

Note that in addition to performing a binary search in four steps, receiver 200 has an additional feature that allows the calibration process to be performed quickly. Receiver 200 performs tuning using DDFS 230. Unlike conventional phase locked loop oscillators, DDFS 230 does not require a locking time and produces a waveform that represents a digitization of a sinusoidal waveform immediately after the FREQUENCY CONTROL SIGNAL changes. Thus the repeated sampling at f1 and f2 can proceed quickly.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   providing a calibration signal at a first frequency corresponding to a low frequency edge of a desired passband to an input of a filter;
   measuring a first value at an output of the filter;
   providing the calibration signal at a second frequency corresponding to a high frequency edge of the desired passband to the input of the filter;
   measuring a second value at the output of the filter;
   comparing the first value to the second value; and
   changing a characteristic of the filter in response to the comparing.

2. The method of claim 1 wherein providing the calibration signal at the first frequency and providing the calibration signal at the second frequency each comprises:
   providing a tone at a corresponding one of the first and second frequencies.

3. The method of claim 1 wherein measuring the first value and measuring the second value each comprises:
   measuring an amplitude of an output signal at the output of the filter.

4. The method of claim 1 wherein measuring the first value and measuring the second value each comprises:
   measuring a power of an output signal at the output of the filter.

5. The method of claim 1 wherein changing the characteristic of the filter comprises:
   changing a capacitance of the filter.

6. The method of claim 5 wherein changing the characteristic of the filter further comprises:
   changing the capacitance of a parallel resonant RLC filter.

7. The method of claim 6 wherein changing the characteristic of the filter further comprises:
   increasing the capacitance of the parallel resonant RLC filter if the first value exceeds the second value; and
   decreasing the capacitance of the parallel resonant RLC filter if the second value exceeds the first value.

8. The method of claim 1 further comprising:
   filtering a radio frequency (RF) input signal using the filter subsequent to the changing.

9. A receiver comprising:
   a filter having a first input for receiving an input signal, a second input for receiving a calibration signal, and an output for providing a filtered signal; and
   a calibration circuit having an input coupled to the output of the filter, and a first output coupled to the second input of the filter, wherein the calibration circuit measures first and second values at the output of the filter when the input signal is respectively at first and second frequencies respectively corresponding to lower and upper edges of a desired passband of the filter, and provides the calibration signal in response to a comparison of the first value to the second value.

10. The receiver of claim 9 wherein the calibration circuit comprises:
    a detection circuit having an input coupled to the output of the filter, and an output; and
    a controller having an input coupled to the output of the detection circuit, and an output coupled to the second input of the filter for providing the calibration signal thereto.

11. The receiver of claim 10 further comprising:
    a multiplexer having a first input for receiving a radio frequency (RF) input signal, a second input for receiving a fixed value, a control input for receiving a select signal, and an output;
    a mixer having a first input coupled to the output of the multiplexer, a second input, and an output coupled to the first input of the filter; and
    a local oscillator having an input for receiving a frequency control signal, and an output coupled to the second input of the mixer.

12. The receiver of claim 11 wherein the local oscillator comprises a direct digital frequency synthesizer.

13. The receiver of claim 11 wherein the calibration circuit further has a second output coupled to the input of the local oscillator for providing the frequency control signal thereto, and a third output coupled to the control input of the multiplexer.

14. The receiver of claim 9 wherein the calibration circuit further measures first and second values at the output of the filter for each of a plurality of values of the calibration signal, and provides a final calibration signal in response to comparisons of the first value to the second value for each of the plurality of values of the calibration signal.

15. The receiver of claim 14 wherein the calibration circuit enables the filter to filter the input signal using the final calibration signal.

16. A receiver comprising:
    a mixer having a first input for receiving an input signal, a second input, and an output;
    a local oscillator having an input for receiving a frequency control signal, and an output coupled to the second input of the mixer;
    an intermediate frequency (IF) filter having a first input coupled to the output of the mixer, a second input for receiving a calibration signal, and an output for providing an IF signal; and
    a calibration circuit having an input coupled to the output of the IF filter, a first output coupled to the input of the local oscillator, and a second output coupled to the second input of the IF filter, for providing the frequency control signal at first and second frequencies corresponding to lower and upper edges of a passband of the IF filter, for measuring first and second values corresponding thereto at the output of the IF filter, and for comparing the first and second values to provide the calibration signal in response thereto.

17. The receiver of claim 16 wherein the local oscillator comprises a direct digital frequency synthesizer.

18. The receiver of claim 16 further comprising:
a multiplexer having a first input for receiving a radio frequency (RF) input signal, a second input for receiving a fixed value, a control input for receiving a select signal, and an output coupled to the first input of the mixer for providing the input signal thereto,
wherein the calibration circuit further has a third output coupled to the control input of the multiplexer for providing the select signal to select the first input of the multiplexer when the receiver is in a normal operation mode, and to select the second input of the multiplexer when the receiver is in a calibration mode.

19. The receiver of claim 16 wherein the calibration circuit comprises:
a detection circuit having an input coupled to the output of the IF filter, and an output; and
a controller having an input coupled to the output of the detection circuit, and an output coupled to the second input of the IF filter for providing the calibration signal thereto.

20. The receiver of claim 19 wherein the detector comprises:
a peak detector having an input coupled to the output of the IF filter, and an output; and
an analog-to-digital converter having an input coupled to the output of the peak detector, and an output coupled to the input of the controller.

* * * * *

UNITED STATES PATENT AND TRADEMARK OFFICE
CERTIFICATE OF CORRECTION

| | | |
|---|---|---|
| PATENT NO. | : 7,577,413 B2 | Page 1 of 1 |
| APPLICATION NO. | : 11/523440 | |
| DATED | : August 18, 2009 | |
| INVENTOR(S) | : Chengming He et al. | |

It is certified that error appears in the above-identified patent and that said Letters Patent is hereby corrected as shown below:

In column 3, line 2, change "enter" to --center--.

In column 8, line 46, change "<" to --≤--.

In column 8, line 48, change "<100>" to --<1100>--.

In column 8, line 52, change "<" to --≤--.

Signed and Sealed this

Tenth Day of August, 2010

David J. Kappos
*Director of the United States Patent and Trademark Office*